United States Patent [19]
Boyer

[11] Patent Number: 5,174,058
[45] Date of Patent: Dec. 29, 1992

[54] BAIT HOOK APPARATUS

[76] Inventor: Wilmer C. Boyer, 9353 Spur Dr., Yuma, Ariz. 85365

[21] Appl. No.: 795,392

[22] Filed: Nov. 21, 1991

[51] Int. Cl.⁵ .................... A01K 83/06; A01K 97/00
[52] U.S. Cl. ...................................... 43/44.8; 43/54.1
[58] Field of Search .................. 43/44.8, 44.2, 44.4, 43/42.1, 42.24, 54.1, 55

[56] References Cited

U.S. PATENT DOCUMENTS

| | | | |
|---|---|---|---|
| 696,018 | 3/1902 | Edgar | 43/44.8 |
| 991,745 | 5/1911 | Randal | 43/44.8 |
| 2,115,493 | 4/1938 | Kosten | 43/44.8 |
| 2,454,879 | 11/1948 | Mattingly | 43/44.8 |
| 2,513,548 | 7/1950 | Buss | 43/44.8 |
| 2,670,562 | 3/1954 | Gould | 43/55 |
| 2,922,247 | 1/1960 | Buss | 43/44.8 |
| 4,972,625 | 11/1990 | Barnes | 43/54.1 |

Primary Examiner—Richard K. Seidel
Assistant Examiner—Chuck Y. Mah
Attorney, Agent, or Firm—S. Michael Bender

[57] ABSTRACT

A fish hook is arranged to include a fishing loop mounted at an upper terminal end, with the fishing loop mounted at an upper distal end of a loop shank, and a coil spring body directed downwardly from the loop shank coaxially aligned relative to the loop shank, with a hook member mounted to a lower distal end of the coil spring body. A plurality of hook members may be mounted at the lower distal end of the coil spring body in a concentric relationship. The invention further is arranged to include a container formed with a freezable gel and wells directed into the body, including the freezable gel to maintain bait mounted to the coil spring body in a fresh condition for subsequent use. Further, the coil spring body may include the spring coils formed of a tubular construction to contain freezable gel therewithin.

3 Claims, 3 Drawing Sheets

BAIT HOOK APPARATUS

BACKGROUND OF THE INVENTION

1. Field of the Invention

The field of invention relates to fish hook construction, and more particularly pertains to a new and improved bait hook apparatus wherein the same is arranged for the mounting of bait about a body portion of the hook construction above an associated hook member.

2. Description of the Prior Art

Fish hooks of various types are utilized throughout the prior art to accommodate various and specialized conditions. Such apparatus is exemplified in U.S. Pat. No. 4,961,280 to Hudson wherein a live bait protector includes a transparent member in surrounding relationship relative to an associated hook to seal the bait to protect the bait from unwanted tampering while in the water.

U.S. Pat. No. 4,688,347 to Krogmann sets forth a bait hook member utilizing confronting hooks for securing a bait member therebetween, such as a live fish and the like.

U.S. Pat. No. 3,879,886 to Thomas sets forth a bait hook including a clip member to secure a portion of bait thereto.

As such, it may be appreciated that there continues to be a need for a new and improved bait hook apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of bait hook apparatus now present in the prior art, the present invention provides a bait hook apparatus wherein the same utilizes a coil spring body to contain bait relative to the hook structure. As such, the general purpose of the present invention, which will be described subsequently in greater detail, is to provide a new and improved bait hook apparatus which has all the advantages of the prior art bait hook apparatus and none of the disadvantages.

To attain this, the present invention provides a fish hook arranged to include a fishing loop mounted at an upper terminal end, with the fishing loop mounted at an upper distal end of a loop shank, and a coil spring body directed downwardly from the loop shank coaxially aligned relative to the loop shank, with a hook member mounted to a lower distal end of the coil spring body. A plurality of hook members may be mounted at the lower distal end of the coil spring body in a concentric relationship. The invention further is arranged to include a container formed with a freezable gel and wells directed into the body, including the freezable gel to maintain bait mounted to the coil spring body in a fresh condition for subsequent use. Further, the coil spring body may include the spring coils formed of a tubular construction to contain freezable gel therewithin.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bait hook apparatus which has all the advantages of the prior art bait hook apparatus and none of the disadvantages.

It is another object of the present invention to provide a new and improved bait hook apparatus which may be easily and efficiently manufactured and marketed.

It is a further object of the present invention to provide a new and improved bait hook apparatus which is of a durable and reliable construction.

An even further object of the present invention is to provide a new and improved bait hook apparatus which is susceptible of a low cost of manufacture with regard to both materials and labor, and which accordingly is then susceptible of low prices of sale to the consuming public, thereby making such bait hook apparatus economically available to the buying public.

Still yet another object of the present invention is to provide a new and improved bait hook apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
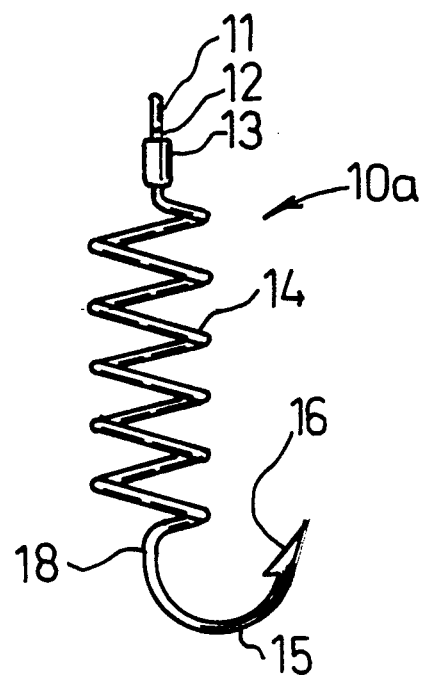
FIG. 1 is an orthographic view of a bait structure utilized by the invention.

With reference now to the drawings, and in particular to FIGS. 1 to 5 thereof, a new and improved bait hook apparatus embodying the principles and concepts of the present invention and generally designated by the reference numeral 10 will be described.

Figure 2:
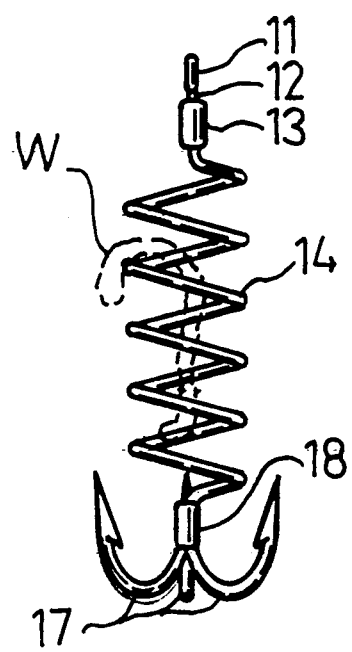
FIG. 2 is an orthographic view of a further configuration of a bait hook construction utilized by the invention.

More specifically, the bait hook apparatus 10 of the instant invention essentially comprises a bait hook member 10a, such as illustrated in FIG. 1, to include a hook upper line receiving loop 11 mounted at an upper distal end of a loop shank 12. A bait abutment member 13 is mounted about the loop shank 12. A coil spring body 14 extends downwardly relative to the loop shank 12 and is coaxially aligned with the loop shank, with the coil spring body 14 arranged to receive various bait mounted therewithin, such as a worm "W" as illustrated in FIG. 2, wound within the spring body 14. A central hook shank 18 mounted coaxially aligned with the loop shank 12 and the coil spring body 14 is formed at a lower distal end of the coil spring body 14 and includes at least one fish hook 15 mounted thereto, wherein the fish hook 15 includes a barb 16. The FIG. 2 illustrates the use of a multiplicity of hooks 17 extending radially from the central hook shank 18 equally spaced relative to one another about the hook shank 18 in a concentric relationship.

Figure 3:
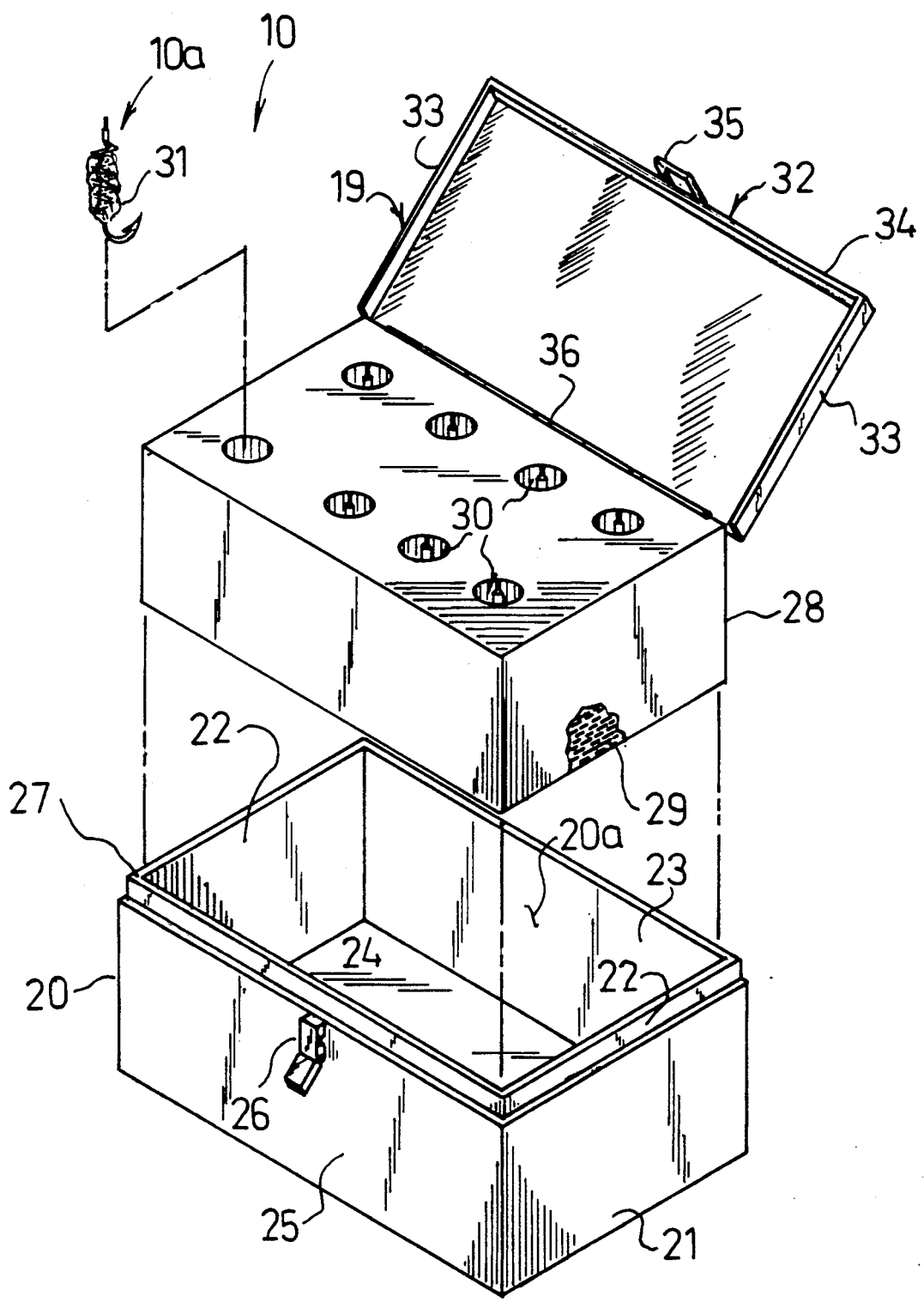
FIG. 3 is an isometric illustration of the bait hook structure mounted within an associated chest cooler.

The FIG. 3 illustrates the invention of the apparatus to include a chest cooler 19. The cooler 19 includes a chest container 20 defined by a container cavity 20a of a predetermined geometric configuration. The container 20 includes container side walls 21 spaced relative to one another, a front wall 25, and a rear wall 23. The interior side walls 22 mounted interiorly of the side walls 21 extend upwardly thereof, with an interior front wall 24 extending upwardly relative to the front wall 25 to define a coplanar upper edge 27 defined by the rear wall 23, the interior front wall 24, and the interior side walls 22. A front wall latch 26 is mounted to the front wall 25 to cooperate with a lid latch 35 mounted to an associated lid 32. A cooler block 28 is provided defined by a block configuration equal to the predetermined geometric configuration of the cavity 28 to be complementarily received within the cavity 20a. The cooler block 28 includes a freezable gel 29 contained therewithin and substantially coextensive throughout the block 28, with the block 28 further including a plurality of block cavity wells 30 directed downwardly from the top wall of the block, wherein each cavity is arranged to receive a bait hook member 10a therewithin that includes a predetermined quantity of bait 31 mounted to the coil spring body 14. Various forms of bait may be utilized including worms and the like, and wherein the coil spring body 14 is arranged to even accommodate various recipes, wherein by way of example, one cup of chicken liver is mixed with one-half cup of wheat flour, one-half teaspoon of garlic powder, blended together and molded. The above example is for example only and is not intended to be limiting of bait recipes to be utilized, but merely exemplify that various food components may be mixed for forming a paste-like mixture to be secured to the coil spring body 14.

A lid 32 is mounted to the cooler block 28 by a hinge 36. The lid 32 includes lid side flanges 33 and a lid front flange 34 to receive the coplanar upper edge 27 within the side and front flanges 33 and 34.

Figure 4:
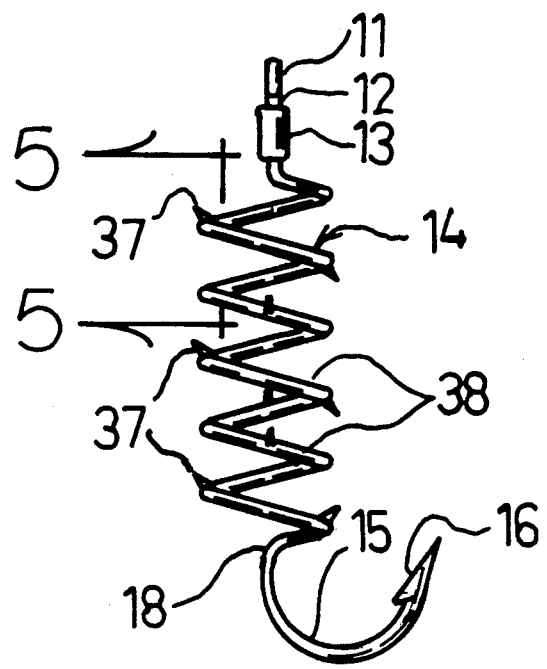
FIG. 4 is an orthographic side view of a further example of a bait hook structure utilized by the invention.
Figure 5:
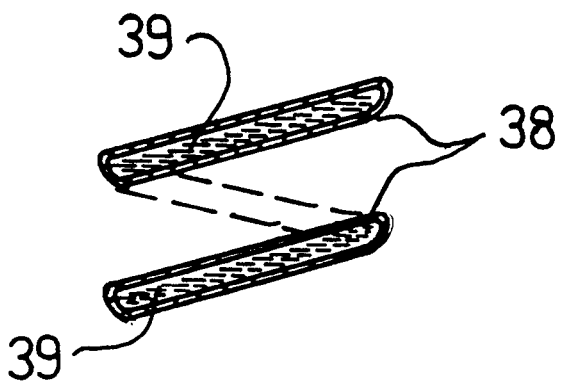
FIG. 5 is an orthographic view, taken along the lines 5—5 of FIG. 4 in the direction indicated by the arrows.

The FIGS. 4 and 5 illustrate the coil spring body 14 including at least one, and preferably a plurality of spring barbs 37, mounted to the spring body 14 to enhance securement of bait to the coil spring body. Further, each spring coil 38 is formed of a tubular configuration including a spring coil freezable gel 39 contained therewithin, wherein the freezable gel within the coil spring is further frozen in association with the cooler block 28 to enhance preservation of bait mounted to the coil spring body 14.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bait hook apparatus, comprising,
    at least one bait hook member, the at least one bait hook member including an upper line receiving loop mounted to an upper distal end of a loop shank, and
    a coil spring body mounted to a lower distal end of the loop shank, and
    the coil spring body including a coil spring body lower distal end, and
    a central hook shank mounted to the coil spring body lower distal end, and the central hook shank including at least one fish hook mounted thereto, and
    the loop shank includes a bait abutment boss mounted in surrounding relationship relative to the loop shank to provide abutment for bait mounted to the coil spring body preventing projection of the bait beyond the coil spring body, and
    a chest cooler, the chest cooler including a chest container, the chest container including container side walls, a container rear wall, and a container front wall, and the container side walls including container interior side walls extending above the container side walls, and a container interior front wall extending above the interior front wall, wherein the container rear wall, the interior front walls, and the interior side walls define a coplanar upper edge extending above the container side walls and the container front wall, and the chest container defining a container cavity of a predetermined geometric configuration, and a cooler block defined by a block configuration substantially equal to the predetermined geometric configuration and complementarily received within the chest container and includes a cooler block top wall, wherein the cooler block wall includes a plurality of block cavity wells extending from the cooler block top wall, and the block cavity extending from the cooler block top wall, and the block cavity wells each arranged to include said at least one bait hook member in a selective manner, and the cooler block includes a freezable gel contained within the cooler block extending throughout the cooler block permitting freezing of the freezable gel to enhance preservation of a bait portion mounted to the coil spring body, and the cooler block includes a lid, the lid including a hinge to hingedly mount the lid to the cooler block, and the lid including lid side flanges and a lid front flange to receive the coplanar upper edge therewithin, and the container front wall including a front wall latch, and the lid including a lid latch for selective securement to the front wall latch to secure the lid to the container.

2. An apparatus as set forth in claim 1 wherein the coil spring body includes a plurality of spaced spring coils, each spring coil including at least one spring barb projecting exteriorly of each spring coil to enhance securement of the bait thereto.

3. An apparatus as set forth in claim 2 wherein each spring coil is formed as a tubular coil member, and each tubular coil member includes a spring coil freezable gel contained within each tubular coil member to permit chilling of the spring coil freezable gel and enhance preservation of the bait mounted to the spring coil body.

* * * * *